United States Patent
Heim et al.

(10) Patent No.: US 8,213,132 B2
(45) Date of Patent: Jul. 3, 2012

(54) MAGNETIC SENSOR HAVING A PHYSICALLY HARD INSULATION LAYER OVER A MAGNETIC BIAS STRUCTURE

(75) Inventors: David Eugene Heim, Redwood City, CA (US); Kim Y. Lee, Fremont, CA (US); Tsann Lin, Saratoga, CA (US); Jih-Shiuan Luo, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 828 days.

(21) Appl. No.: 11/938,677

(22) Filed: Nov. 12, 2007

(65) Prior Publication Data

US 2008/0062576 A1 Mar. 13, 2008

Related U.S. Application Data

(62) Division of application No. 10/815,447, filed on Mar. 31, 2004, now Pat. No. 7,344,330.

(51) Int. Cl.
*G11B 5/39* (2006.01)

(52) U.S. Cl. .................................................. 360/324.2
(58) Field of Classification Search .................. 360/322, 360/324–324.2
See application file for complete search history.

(56) References Cited

U.S. PATENT DOCUMENTS

| 7,158,352 B2 * | 1/2007 | Sasaki et al. ................. 360/322 |
| 7,675,718 B2 * | 3/2010 | Chang et al. ............. 360/324.12 |

* cited by examiner

*Primary Examiner* — Allen Heinz
(74) *Attorney, Agent, or Firm* — Zilka-Kotab, PC

(57) ABSTRACT

A narrow track-width magnetoresistive sensor by defining a trench formed between first and second hard bias layers and depositing the sensor into the trench. The sensor can include a sensor stack sandwiched between first and second electrically conductive lead layers. First and second electrically insulating side walls are formed at either side of the sensor stack. First and second hard bias layers extend from the sides of the sensor stack, being separated from the sensor stack by the first and second electrically insulating side walls. First and second physically hard insulation layers are provided over each of the hard bias layers.

4 Claims, 14 Drawing Sheets

MAGNETIC SENSOR HAVING A PHYSICALLY HARD INSULATION LAYER OVER A MAGNETIC BIAS STRUCTURE

RELATED APPLICATIONS

The present invention is a divisional application of U.S. patent application Ser. No. 10/815,447 (now U.S. Pat. No. 7,344,330, issued on Mar. 18, 2004), entitled TOPOGRAPHICALLY DEFINED THIN FILM CPP READ HEAD FABRICATION, filed on Mar. 31, 2004, which is incorporated by reference as if fully set forth herein.

FIELD OF THE INVENTION

The present invention relates to magnetoresistive sensors and more particularly to a method of constructing a magnetoresistive sensor having improved track width definition.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of a rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

A spin valve sensor is characterized by a magnetiresistive (MR) coefficient that is substantially higher than the MR coefficient of an anisotropic magnetoresistive (AMR) sensor. For this reason a spin valve sensor is sometimes referred to as a giant magnetoresistive (GMR) sensor. When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer). A pinning layer in a bottom spin valve is typically made of platinum manganese (PtMn). The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Sensors can also be categorized as current in plane (CIP) sensors or as current perpendicular to plane (CPP) sensors. In a CIP sensor, current flows from one side of the sensor to the other side parallel to the planes of the materials making up the sensor. Conversely, in a CPP sensor the sense current flows from the top of the sensor to the bottom of the sensor perpendicular to the plane of the layers of material making up the sensor.

Yet another type of sensor, somewhat similar to a CPP GMR sensor is a Tunnel Valve. A tunnel valve employs an electrically insulating spacer layer rather than a conductive spacer layer. A tunnel valve operates based on quantum mechanical tunneling of electrons through the insulating spacer layer. This tunneling is maximized when the magnetizations of the free and pinned layers are parallel to one another adjacent to the spacer layer.

The extremely competitive data storage market requires ever increasing data density and data rate capabilities from memory devices such as disk drives. This need for increased data storage capabilities has lead to increased interest in perpendicular recording. In a perpendicular recording system, data is recorded by magnetic fields directed perpendicular to the surface of the magnetic medium. Researchers have found that CPP GMR sensors are especially suited for use in such perpendicular magnetic recording. There is therefore, an increased need for a practical CPP sensor that can be used in such a perpendicular recording systems.

The demand for increased data density has also lead to an ever increasing need for smaller track width sensors. By making the track width of a sensor smaller, a greater number of tracks of data can fit onto a given disk. Current manufacturing techniques are fast approaching the limit to which the track width of a sensor can be shrunk, such as for example, photolithographic processes used to pattern a mask to form sensor.

Traditionally, sensors have been constructed, by depositing a full film of sensor material, on a substrate. A photoresist mask is then formed over an area that is to be the sensor and other areas are left uncovered. The photoresist mask has been constructed by spinning on a layer of photoresist and then photolithographically developing the photoresist to form the mask. Factors such as the wavelength of light used to develop the photoresist, effects of photoresist thickness on focal length, and material properties of the photoresist, limit the amount by which the track width of a sensor can be reduced.

After the photoresist mask has been defined, an ion mill is used to remove unwanted sensor material in the unmasked regions. This ion milling process deleteriously affects a portion of the sensor at the sensor edges. Ion bombardment of the sensor material at the sides of the sensor damages the sensor material at the sides leaving a percentage of the side portions of the sensor infective for sensing magnetic signals. With a great enough sensor width, the amount of damaged sensor material makes up only a small percentage of the total sensor material and the effect is negligible. However, as sensor widths (ie. track widths) decrease, the percentage of damaged sensor material increases to the point where sensor performance is seriously degraded.

Another problem associated with the ion milling process described above is that the use of ion milling requires the use of a thicker photoresist mask than would otherwise be necessary. As those skilled in the art will appreciate, increased photoresist thickness undesirably affects focus depth during the photolithography process, leading to poorer patterning resolution.

Therefore, there is a strong felt need for methods manufacturing high performance sensor having very small track widths. There is also a strong felt need for a method of constructing such a small trackwidth sensor as a CPP sensor.

SUMMARY OF THE INVENTION

The present invention provides a magnetic sensor having a very narrow and well defined track width. In one embodiment the sensor includes a sensor stack having first and second side walls and sandwiched between first and second electrodes. First and second electrically insulating side walls are formed at each of the sides of the sensor stack. A hard bias layer extends from each of the sides of the sensor stack, and a physically hard insulation layer is formed over the hard bias layer.

In another embodiment of the invention, the sensor stack can be sandwiched between first and second electrically insulating gap layers. First and second hard bias layers extend from the sides of the sensor stack and first and second electrically insulating leads are formed over the first and second hard bias layers. First and second CMP stop layers, which can be, for example, diamond like carbon (DLC), alumina or $SiO_2$ are formed over the first and second electrically conductive leads.

In order construct such as sensor, a substrate is first provided on which photoresist mask is formed. The mask is formed to cover a sensor area, where the desired sensor is to be formed. With the mask in place, a layer of magnetic material is deposited and the photoresist is lifted off leaving a trench formed between first and second hard bias layers. Thereafter sensor material layers can be deposited full film. A portion of these layers will be deposited into the trench while other portions of the deposited sensor material will be deposited outside of the trench. A chemical mechanical polishing process can then be performed to remove portions of the sensor material falling outside of the trench.

The present invention can be used to construct either a current perpendicular to plane (CPP) sensor or a (CIP) sensor. If a CPP sensor is to be constructed, before depositing the sensor material, a layer of SiO2 can be deposited. This would be followed by reactive ion etching which would remove horizontally disposed portions of the SiO2, leaving electrically insulating walls formed at the sides of the trench. Such electrically insulating walls would be advantageous in preventing sense current shunting.

In addition, to assist the CMP process, after depositing the hard bias layers, a layer of physically hard material can be deposited to form a CMP stop. This material would preferably be alumina ($Al_2O_3$), but could also be for example diamond like carbon or $SiO_2$.

The present invention advantageously provides a method for defining the track width of a sensor by the topography of the hard bias layers previously formed and does not define the track width by ion milling as has been done in the prior art. Therefore, the present invention avoids the sensor material damage experienced using prior art ion mill track width definition.

By eliminating the ion milling process previously used to define the track width of sensors, the present invention also advantageously allows the use of a thinner photoresist. This very importantly allows for higher patterning resolution than was previously possible.

BRIEF DESCRIPTION OF THE DRAWINGS

For a fuller understanding of the nature and advantages of this invention, as well as the preferred mode of use, reference should be made to the following detailed description read in conjunction with the accompanying drawings.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
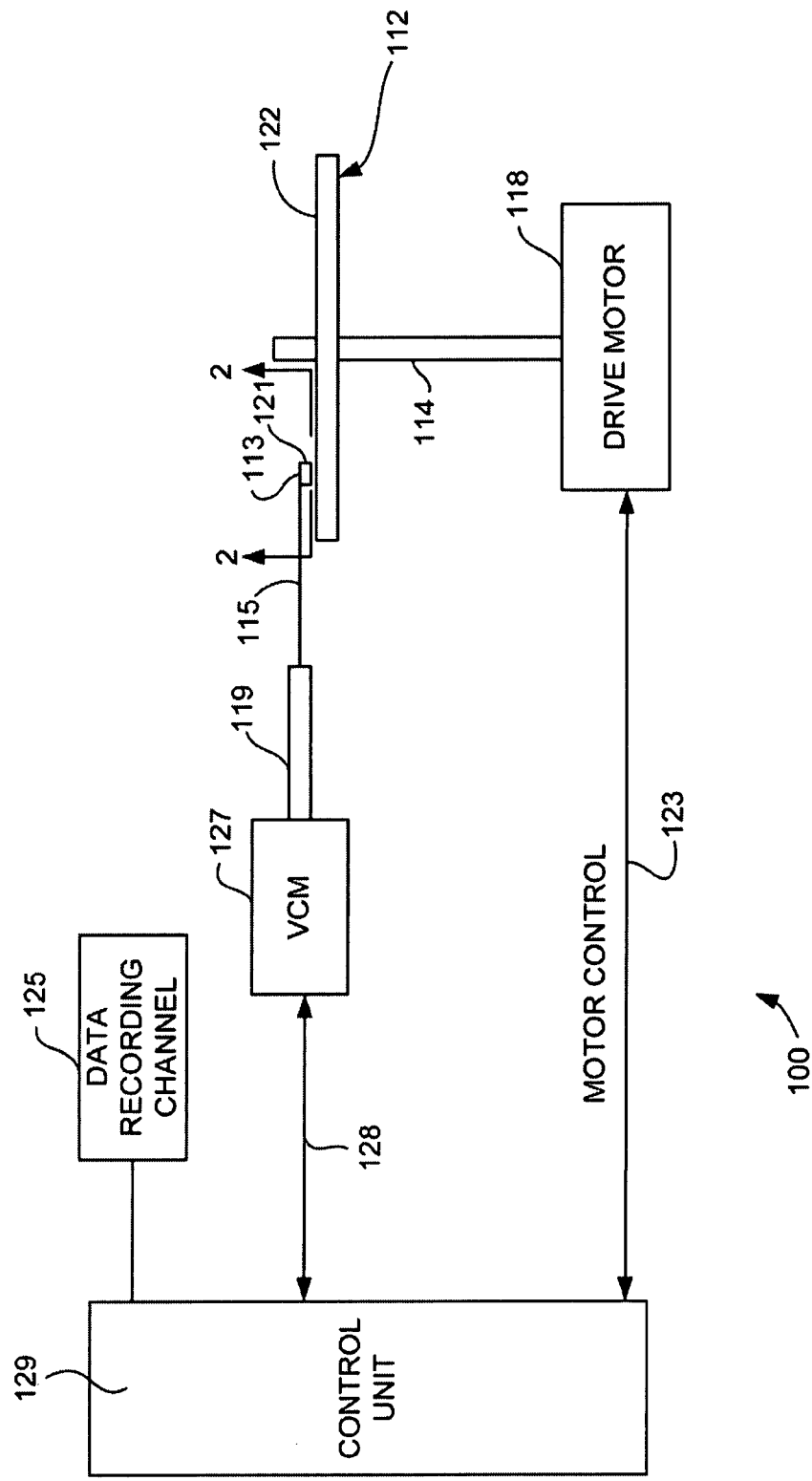
FIG. 1 is a schematic illustration of a magnetic data storage system in which the present invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
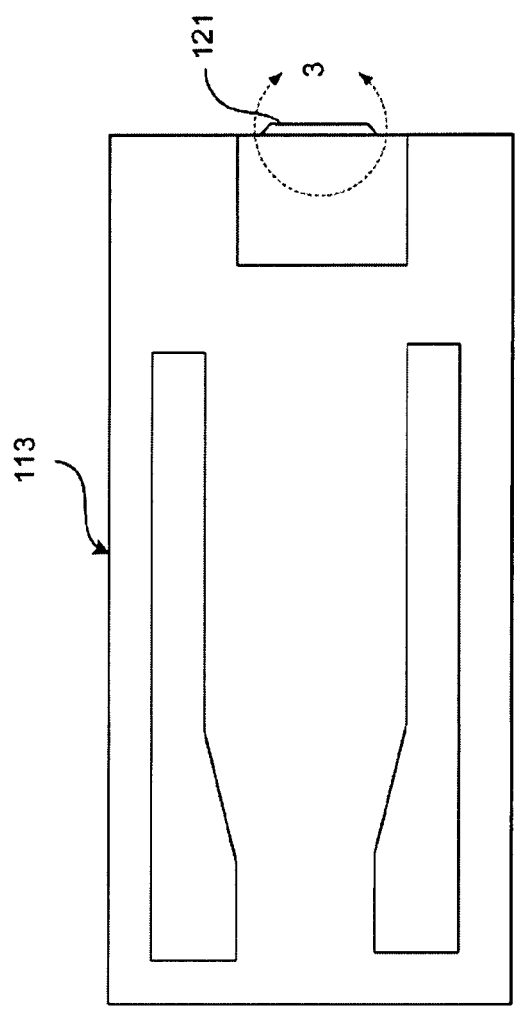
FIG. 2 is an air bearing surface (ABS) view, taken from line 2-2 of FIG. 1, of a slider showing the position of a magnetic head formed thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
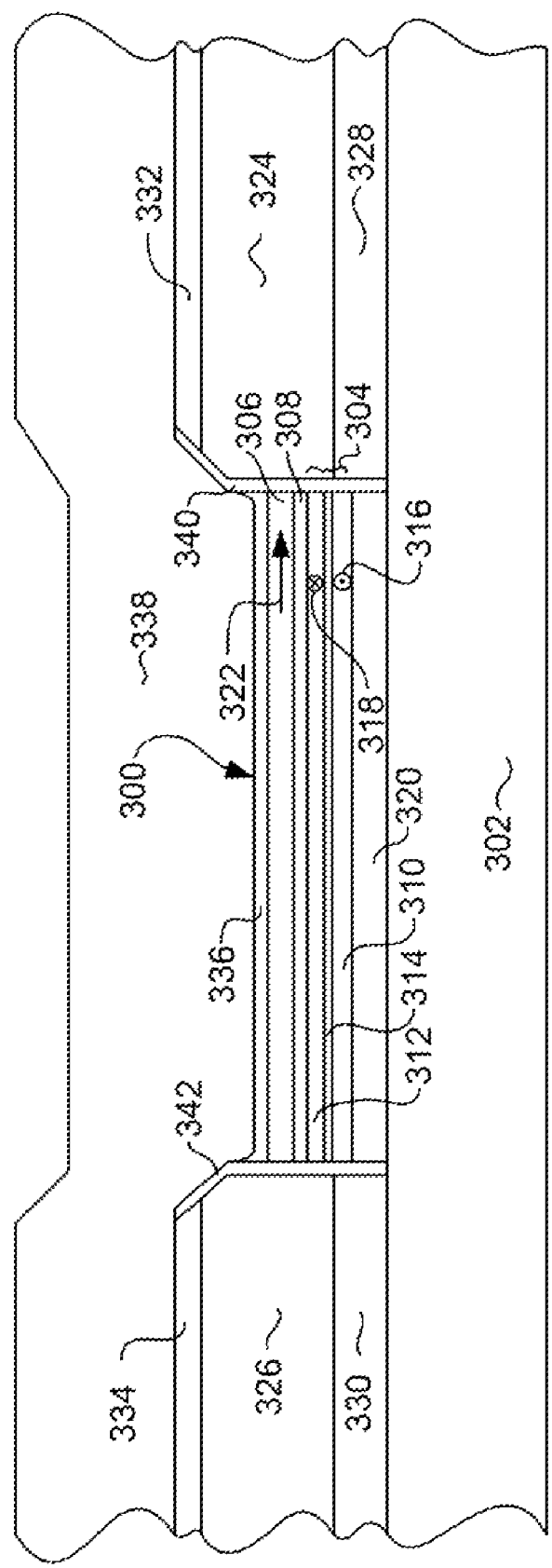
FIG. 3 is an ABS view, taken from circle 3 of FIG. 2, of a magnetoresistive sensor according to an embodiment of the invention.

With reference now to FIG. 3, a current perpendicular to plane GMR sensor 300 according to a possible embodiment of the invention is constructed upon a first electrode 302. The first electrode 302 is preferably constructed of a magnetic, electrically conductive material such as NiFe and also serves as a first magnetic shield to prevent the sensor 300 from detecting adjacent bits of data. The sensor 300 includes a pinned layer 304 separated from a free layer 306 by a non magnetic electrically conductive spacer layer 308. The pinned may be for example an antiparallel pinned layer layer having first and second magnetic layers 310, 312 separated by a coupling layer 314 which can be constructed of for example Ru. The magnetic layers 310, 312 of the pinned layer can be constructed of NiFe or some other suitable magnetic material, and have magnetizations that are pinned antiparallel to one another perpendicular to air bearing surface (ABS) as indicated by symbols 316, 318. The magnetization of the pinned layer 304 can be set by exchange coupling with a layer of antiferromagnetic material 320, which can be for example PtMn or IrMn. While an antiferromagnetic material does not in and of itself have a magnetization, when exchange coupled with a magnetic material it can very strongly pin the magnetization of the magnetic material. Alternatively, the pinned layer 304 could be self pinned, in which case it would be pinned by a combination of intrinsic anisotropy of the magnetic layers 310, 312 and by the effect of magnetostriction of the magnetic layers combined with compressive stresses intrinsic in the sensor 300. If the sensor were to be self pinned, the relatively thick AFM layer 320 would not be required.

The free layer 306 is constructed of a magnetic material such as NiFe or NiCo or some other magnetic material, and has a magnetization that is biased parallel to the ABS as indicated by arrow 322, but is free to rotate in the presence of a magnetic field. The magnetization of the free layer 306 is biased by first and second bias layers 324, 326 formed at either side of the sensor 300. The bias layers are constructed of a relatively high coercivity magnetic material such as CoPtCr and can be magnetized by placing the sensor 300 in a strong magnetic field. The bias layers 324, 326 should be at about the height of the free layer 322, and this height can be adjusted by adjusting the height of first and second insulation layers 328 330, which can be constructed of for example $SiO_2$.

Another set of insulation layers 332, 334 can be provided atop the bias layers 324, 326, and can be constructed of for example alumina ($Al_2O_3$), or alternatively diamond like carbon or $SiO_2$. A capping layer 336, such as Ta can be provided at the top of the sensor to protect the sensor materials from corrosion during manufacturing.

A second electrode 338 is formed on top of the sensor 300 and extends laterally outward therefrom. The electrode 338, is constructed of a magnetic, electrically conductive material such as NiFe and is electrically connected with the sensor 300, but electrically insulated from the bias layers 324, 326 by insulation layers 332, 334.

With continued reference to FIG. 3, sense current flows between the first and second electrodes 338, 302 through the sensor 300. First and second insulation walls 340, 342 formed at first and second laterally opposed side walls of the sensor 300 prevent sense current flowing through the sensor 300 from being shunted to the hard bias layers 324, 326. The side walls can be constructed of many electrically insulating materials, and are preferably constructed of $SiO_2$. It should be pointed out that while the preferred embodiment includes the insulating side walls 340, 342, the sensor 300 could operate without such walls if the bias layers 324, 326 are not electrically connected with other structures or circuitry, and a sensor not having such side walls 340, 342 would be considered to fall within the scope of the invention.

Figure 4:
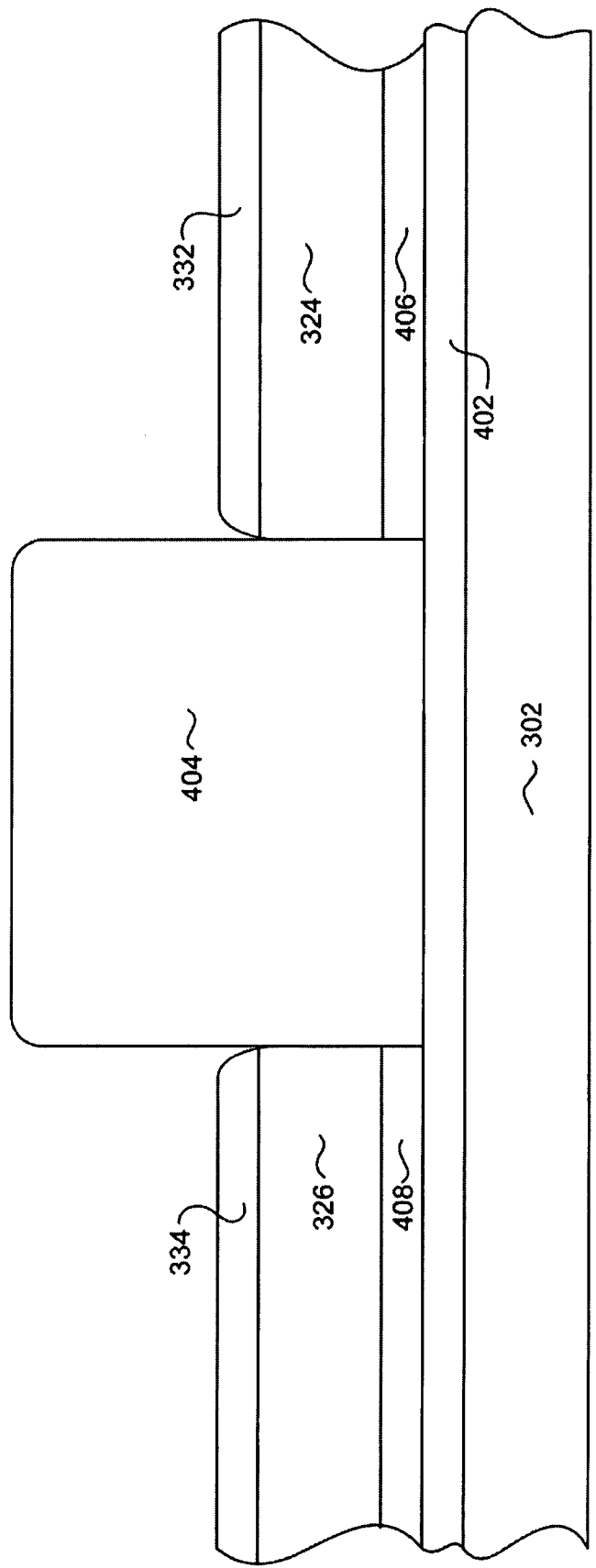
FIG. 4-10 are ABS views of the magnetoresistive sensor of FIG. 3 in various intermediate stages of manufacture.
Figure 5:
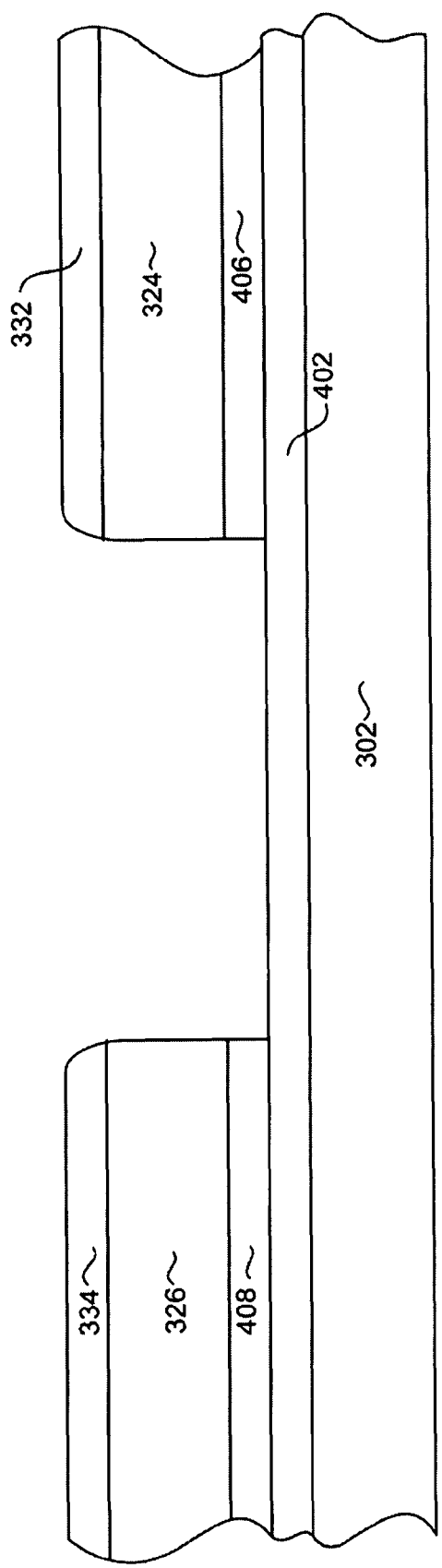

FIGS. 4-10, illustrate a method of constructing the sensor 300. With particular reference to FIG. 4, the first electrode 302 is provided. This electrode is preferably formed from electroplated NiFe and can be formed on a substrate such as alumina or some other dielectric material. A layer of non-magnetic dielectric material 402, (preferably $SiO_2$) is deposited full film on top of the electrode. The thickness of the dielectric material 402 is chosen such that the hard bias layer will align to the free layer (306 in FIG. 3) in subsequent steps. This is required for forming the UCJ sensors.

With continued reference to FIG. 4, a photoresist mask 404 is then formed over the dielectric layer 402 covering a region in which the sensor 300 is desired to be formed. The photoresist mask can be a simple single level mask as shown or could be a bi-layer mask. The photoresist mask is formed by spinning on a full film of photoresist and then photolithographically patterning the photoresist. After developing the photoresist the desired mask portion 404 remains and other portions are dissolved away.

After forming the mask 404, electrically conductive seed layer 406, 408 is deposited, preferably by sputtering. The seed layer could be many electrically conductive materials and is preferably NiFe. After depositing the seed layer 406, the hard bias layers 324, 326 are electroplated onto the seed layers. The electrically insulating material layers 332, 334 are then deposited, preferably by sputtering, onto the bias layers 324, 326. The electrically insulating material layers 332, 334 provide a CMP stop for a chemical mechanical polishing process that will be described below. The photoresist mask can then be lifted off, defining a trench between the first and second hard bias layers 324, 326 and resulting in the structure shown with reference to FIG. 5.

Figure 6:
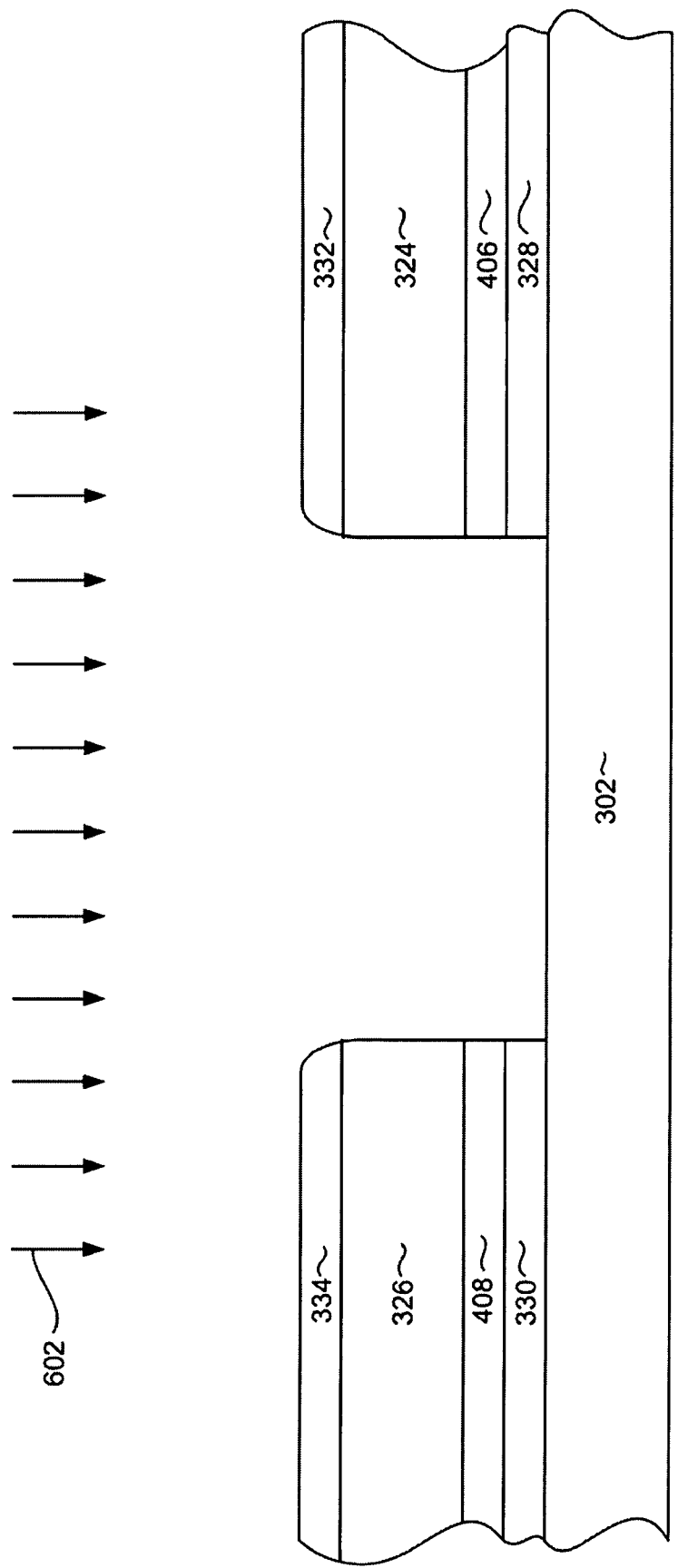

With reference now to FIG. 6, a reactive ion etch process 602 is performed to remove portions of the insulation layer 402 that are not covered by the seed layers 328, 330, bias layers 324, 326 and insulation layer 332, 334.

Figure 7:
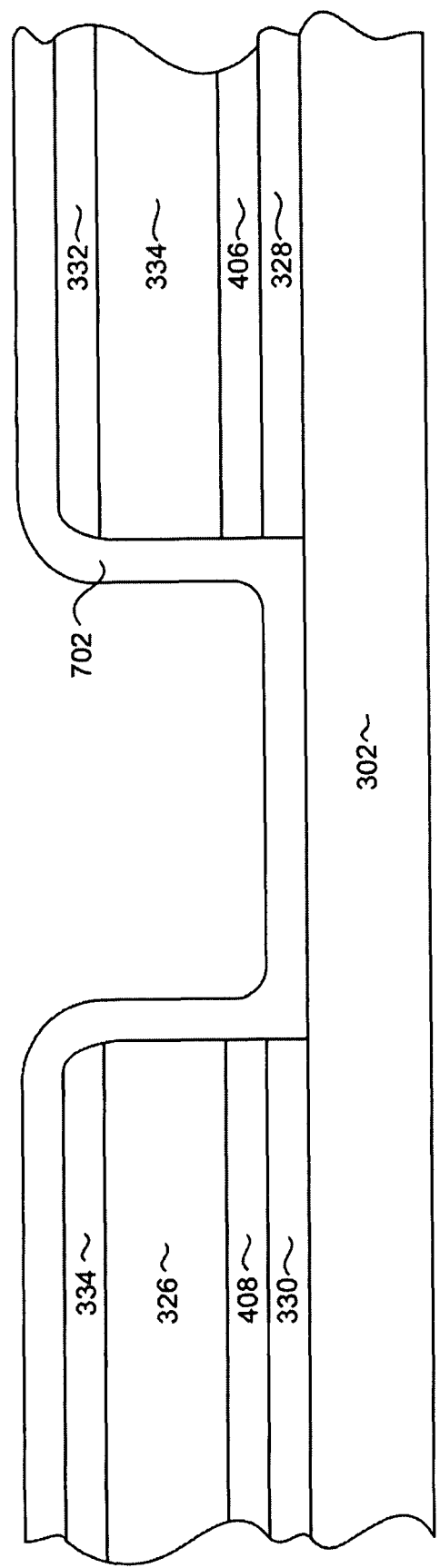

With reference to FIG. 7, an electrically insulating material 702 such as $SiO_2$ is deposited, preferably by chemical vapor deposition (CVD). $SiO_2$ is preferred because of its tendency to deposit conformally. By nature it will deposit with roughly the same thickness on vertical surfaces such as the sides of the hard bias layers 324, 326 as on the horizontal surfaces such as the first electrode 302 and insulation layers 332, 334.

Figure 8:
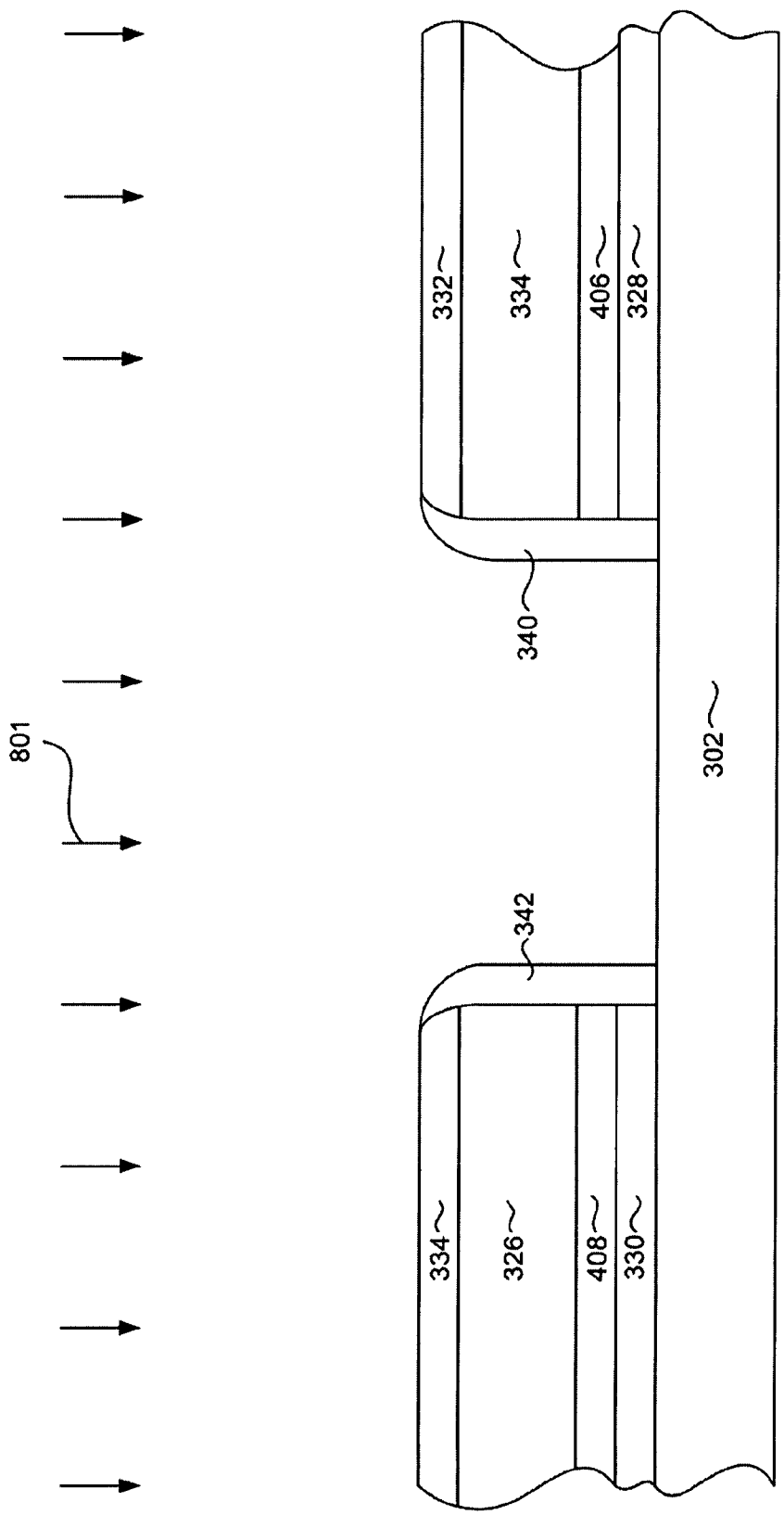

With reference now to FIG. 8, a reactive ion etch (REI) process 801 is performed to remove portions of the $SiO_2$ insulation layer 702, forming the insulating side walls 340, 342. Reactive ion etching is directional process and will remove material at a much greater rate when that material is formed in a plane normal to the direction of the RIE than when the material is in a plane parallel to the direction of the RIE. This means that the RIE process has the ability to remove the horizontal portions of the $SiO_2$ layer 702, while leaving the side wall portions 340, 342.

Figure 9:
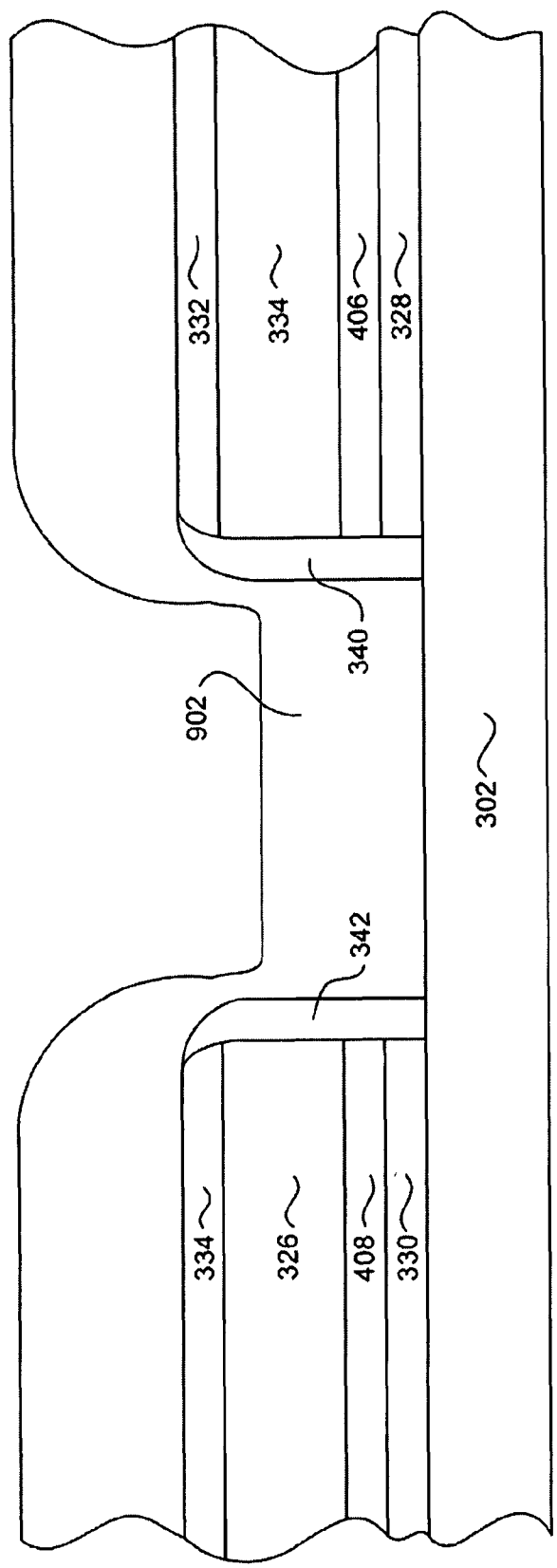
Figure 10:
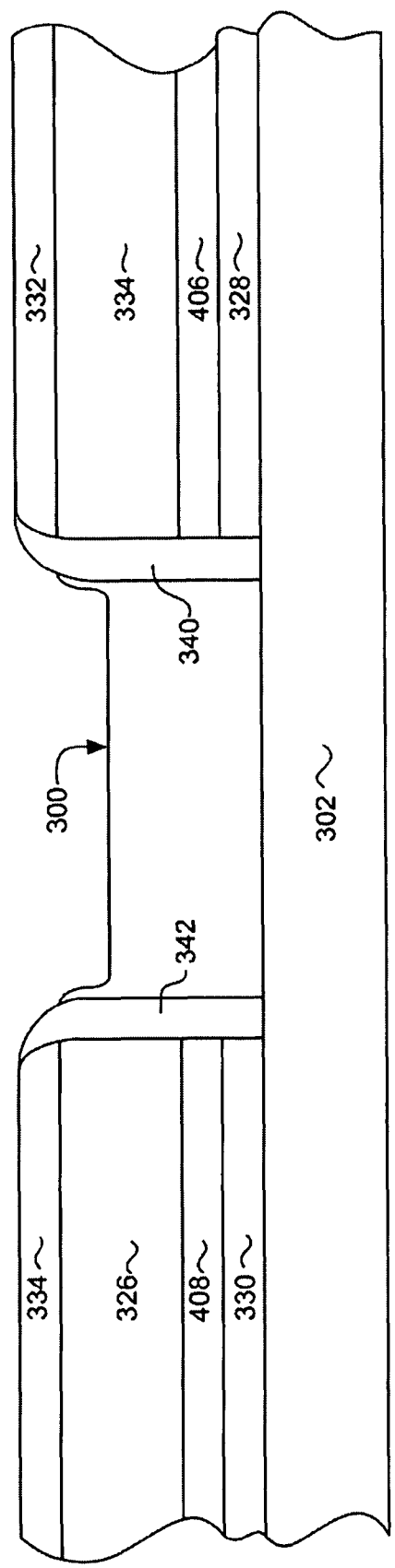

With reference now to FIG. 9, the sensor layers are deposited full film 902. It should pointed out that the sensor layers will consist of the various sensor material layers 320, 310, 314, 312, 306, 330, but for purposes of clarity have been shown generally as 902. After the sensor material 902 has been deposited, a chemical mechanical polishing process is performed to remove sensor material deposited outside of the sensor area, resulting in the structure illustrated in FIG. 10. The insulation layers 332, 334, being preferably constructed of a hard material, provide a CMP stop. Thereafter, the second shield, 338 can be formed resulting in the structure described with reference to FIG. 3. The second shield can be formed by first sputter depositing an electrically conductive seed layer and then electroplating a magnetic, electrically conductive material such as NiFe. Although the invention has been described with reference to FIGS. 3-10 as a CPP GMR, the present invention could be embodied in another type of sensor such as CIP GMR or a tunnel valve (TMR). For example, if the sensor 300 were a tunnel valve, the spacer 308 would be a non-magnetic electrically insulating material such as alumina.

Figure 11:
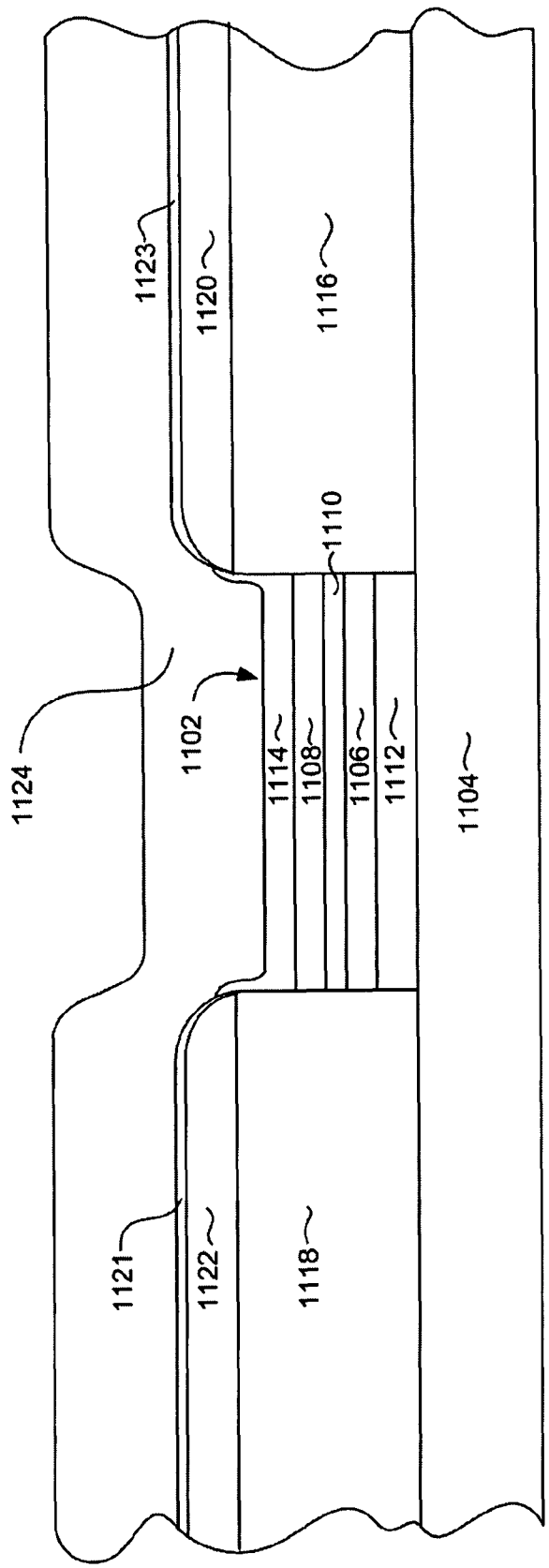
FIG. 11 is an ABS view of magnetoresistive sensor according to an alternate embodiment of the invention.

With reference now to FIG. 11, the present invention could be embodied in a current in plane (CIP) GMR sensor 1102. The sensor 1102 sits upon a first gap layer 1104, which is constructed of a non-magnetic, dielectric layer such as for example alumina. The sensor 1102 includes a magnetic pinned layer 1106 separated from a magnetic free layer 1108 by a non-magnetic, electrically conductive spacer layer 1110 such as Cu. The pinned layer 1106 can be for example an antiparallel coupled pinned layer such as that described with reference to FIG. 3, and can be pinned by an AFM layer 1112. The free layer 1108 can be constructed of for example NiFe or NiCo. A capping layer 1114 may be provided on top of the sensor to protect the sensor from corrosion and other damager during manufacture.

With continued reference to FIG. 11, first and second hard bias layers 1116, 1118 are provided at either side of the sensor to provide magnetic biasing for the free layer 1108. The hard bias layers are constructed of a high coercivity, magnetic material such as CoPtCr. First and second lead layers 1120, 1122 may also be provided on top of the bias layers 1116, 1118, and can be constructed of many electrically conductive materials such as for example Cu, or Au. Although the leads 1120, 1122 are shown extending to inner edges of the hard bias layers 1116, 1118, they could also extend over a portion of the sensor 1102 such as in a lead overlay design. First and second CMP stop layers 1121, 1123 may also be formed on top of the leads 1120, 1122. The CMP stop is preferably constructed of a physically hard material such as alumina ($Al_2O_3$), diamond like carbon, or $SiO_2$ and will be useful for reasons that will become apparent with reference to the construction of the sensor 1102.

A second gap layer 1124, formed of a non-magnetic, dielectric material, extends over the top of the sensor 300 and leads 1120, 1122. The second gap layer 1124 can be constructed of alumina or some other dielectric material. It should also be pointed out that first and second magnetic shields would also likely be included below the first gap layer 1104 and above the second gap layer 1124 but are omitted from FIG. 11 for purposes of clarity.

Figure 12:
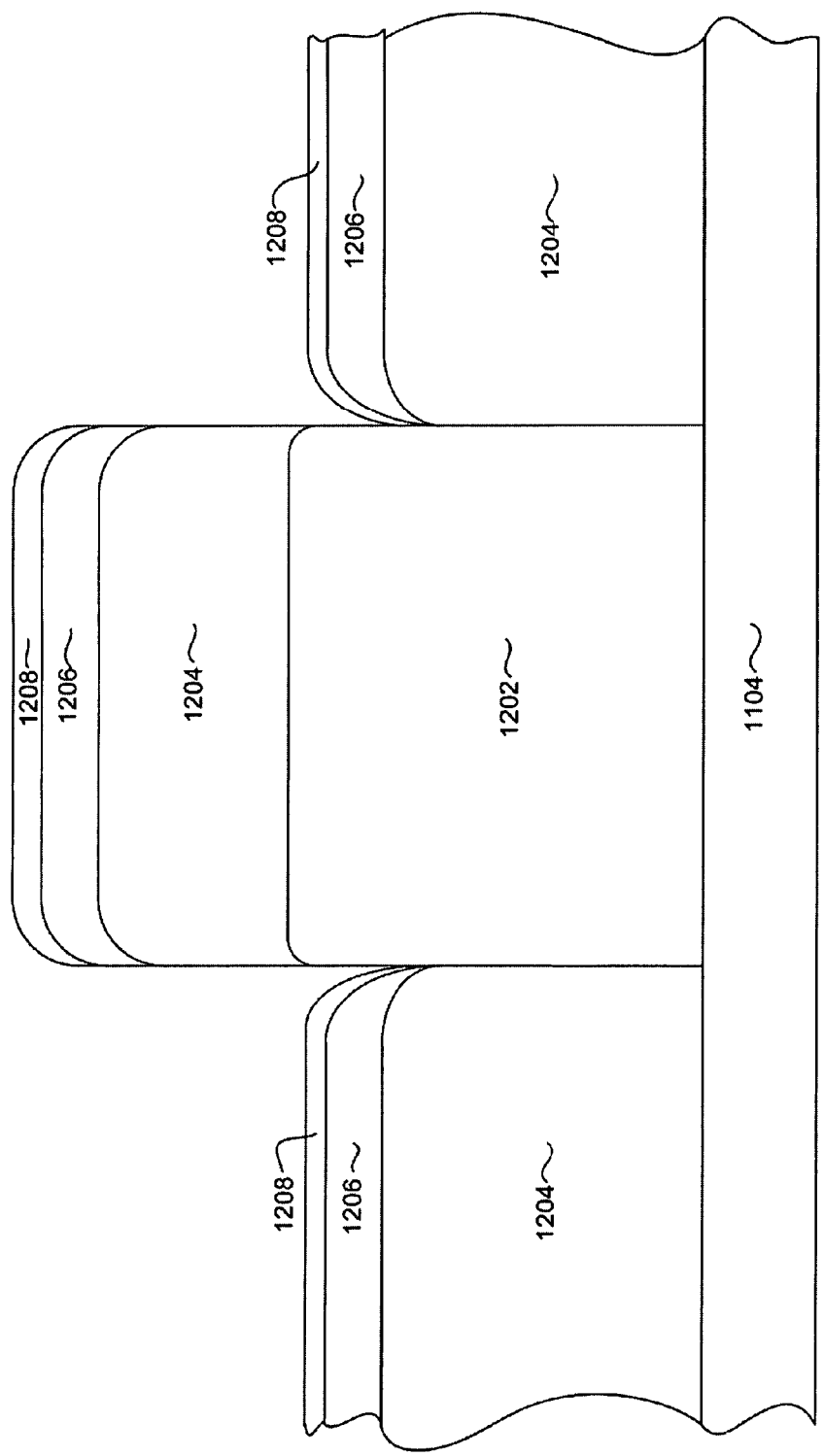
FIGS. 12-14 are ABS views of the magnetoresistive sensor of FIG. 11 in various intermediate stages of manufacture.
Figure 13:
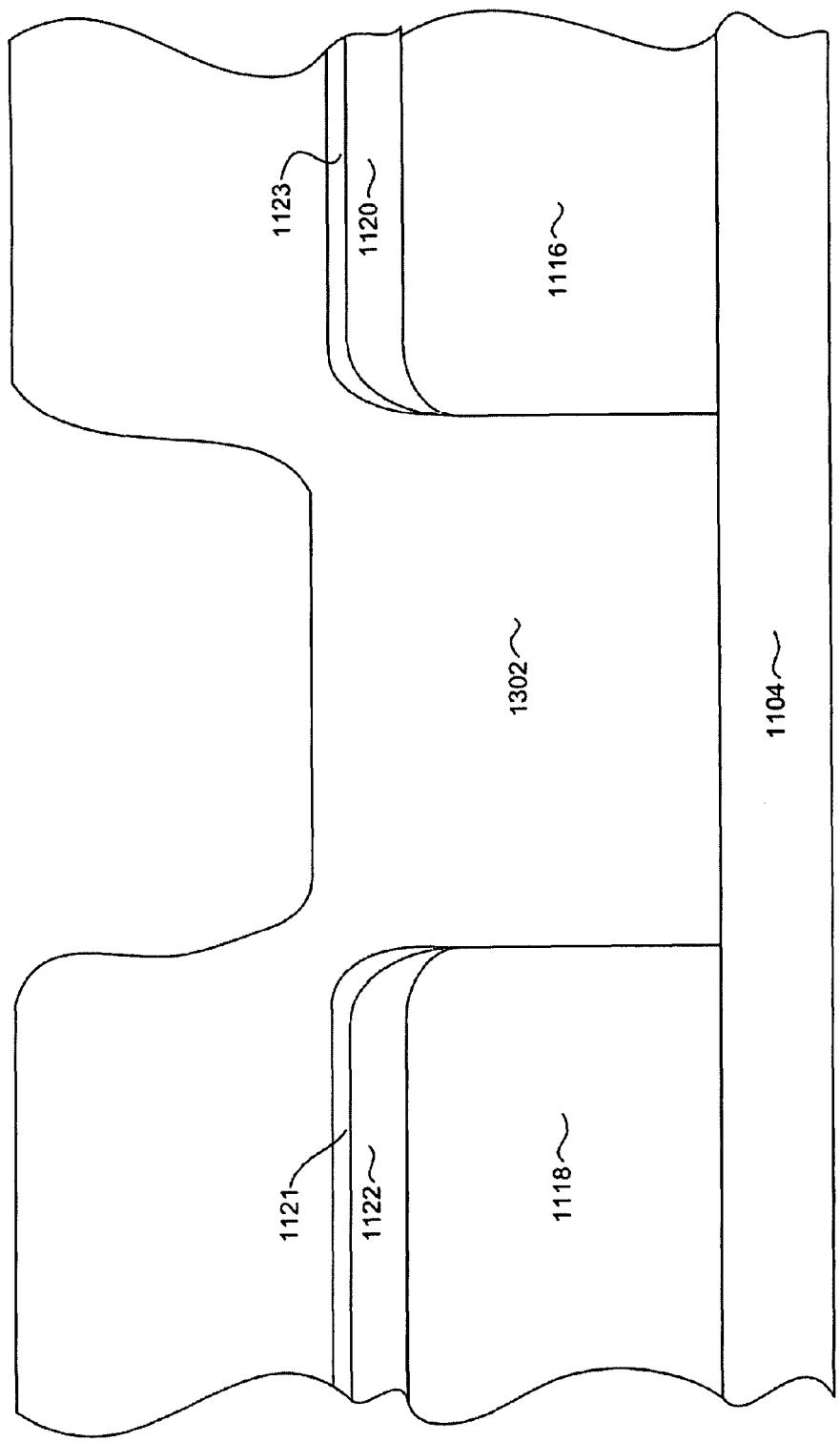
Figure 14:
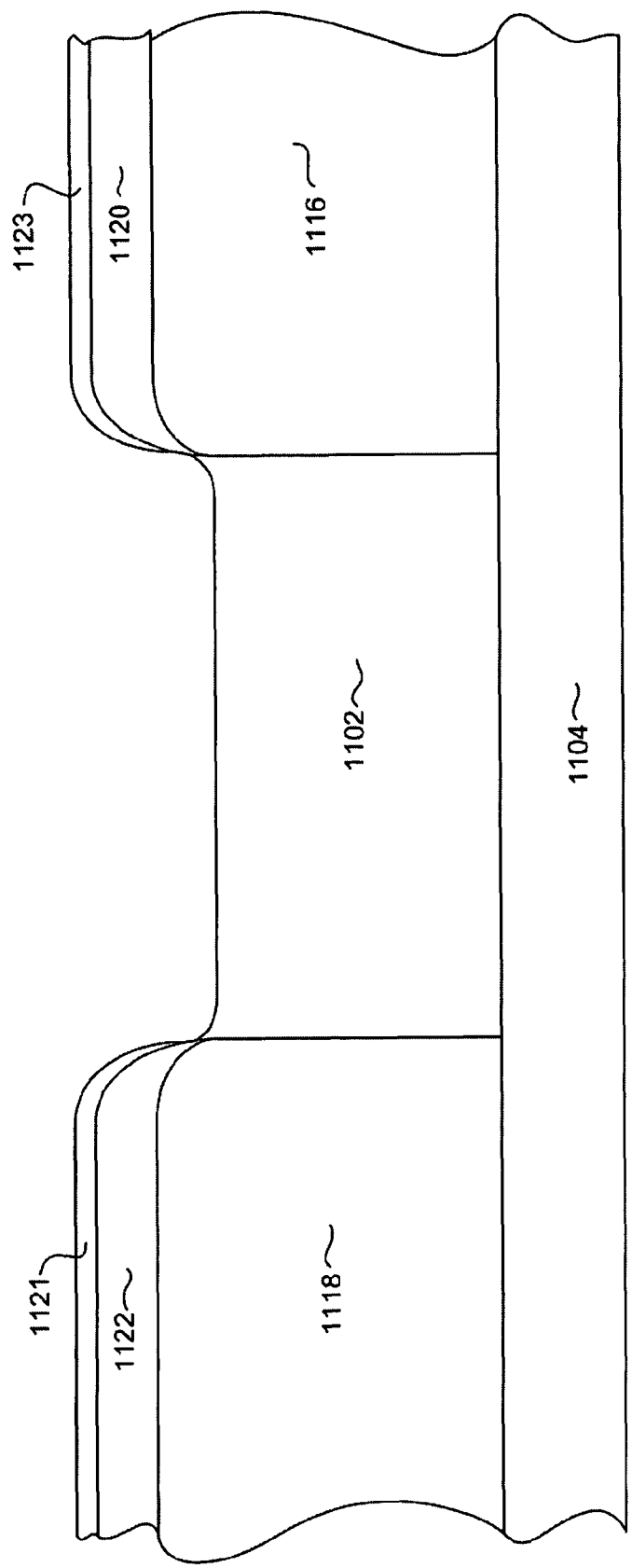

With reference to FIGS. 12-14, a method for constructing the sensor illustrated in FIG. 11 is described. With particular reference to FIG. 12, the first gap layer 1104 is formed and a photoresist mask 1202 is constructed thereon, using methods as described with reference to FIG. 4. The magnetic hard bias material 1204, lead material 1206, and CMP stop material 1208 are then deposited onto the first gap 1104 and photoresist mask 1202.

With reference to FIG. 13, the photoresist mask 1202 is lifted off and sensor material 1302 is deposited full film. Again, the sensor material will actually consist of several layers, such as those that will eventually makeup the free layer 1108, pinned layer 1106 and spacer layer 1110 among others. These multiple layers are depicted as a single layer 1302 in FIG. 13 for purposes of clarity. With reference to FIG. 14, a chemical mechanical polishing process is performed to remove extraneous sensor material 1302 (FIG. 13), forming sensor 1102. Thereafter, the second gap can be deposited resulting in the structure described with reference to FIG. 11.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head comprising:
   a first electrode;
   a magnetoresistive sensor having first and second laterally opposed sides formed upon said first electrode;
   first and second electrically insulating walls formed at said first and second sides of said sensor;
   first and second magnetic hard bias layers extending laterally outward from said first and second walls;
   first and second physically hard electrically insulating layers formed over said first and second hard bias layers, the first and second physically hard electrically insulating layers being constructed of a material that is resistant to removal by chemical mechanical polishing, and being formed such that no portion of the first and second physically hard electrically insulating layers extend over the sensor; and a second electrode formed over said sensor and said physically hard electrically insulating layers.

2. A magnetic head as in claim 1, wherein said physically hard electrically insulating layers comprise alumina ($Al_2O_3$).

3. A magnetic head as in claim 1 wherein the first and second electrically insulating walls comprise $SiO_2$.

4. A magnetic data memory system, comprising:
magnetic disk;
a motor connected with said disk rotating said disk;
a slider;
an actuator connected with said slider to position said slider adjacent said disk;
a magnetic sensor connected with said slider, said sensor comprising:
a first electrode;
a magnetoresistive sensor having first and second laterally opposed sides formed upon said first electrode;
first and second electrically insulating walls formed at said first and second sides of said sensor;
first and magnetic hard bias layers extending laterally outward from said first and second walls;
first and second physically hard electrically insulating layers formed over said first and second hard bias layers, the first and second physically hard electrically insulating layers being constructed of a material that is resistant to removal by chemical mechanical polishing, and being formed such that no portion of the first and second physically hard electrically insulating layers extend over the sensor; and
a second electrode formed over said sensor and said physically hard electrically insulating layers.

* * * * *